United States Patent [19]

Mills et al.

[11] Patent Number: 4,798,628

[45] Date of Patent: Jan. 17, 1989

[54] SETTABLE MINERAL CLINKER COMPOSITIONS

[75] Inventors: Peter S. Mills, Burton-on-Trent; Geoffrey R. Long, Kent, both of United Kingdom

[73] Assignee: Blue Circle Industries PLC, Aldermaston, Great Britain

[21] Appl. No.: 77,021

[22] Filed: Jul. 23, 1987

Related U.S. Application Data

[63] Continuation of Ser. No. 792,746, Oct. 30, 1985, abandoned.

[30] Foreign Application Priority Data

Oct. 30, 1984 [GB] United Kingdom ................. 8427456
May 20, 1985 [GB] United Kingdom ................. 8512675

[51] Int. Cl.$^4$ ................................................. C04B 7/32
[52] U.S. Cl. ....................................... 106/104; 106/89; 106/109; 106/120; 106/315
[58] Field of Search ................. 106/89, 315, 104, 105, 106/109, 120

[56] References Cited

U.S. PATENT DOCUMENTS

| | | | |
|---|---|---|---|
| 3,155,526 | 11/1964 | Klein | 106/104 |
| 3,251,701 | 5/1966 | Klein | 106/104 |
| 3,857,714 | 12/1974 | Mehta | 106/104 X |
| 3,860,433 | 1/1975 | Ost et al. | 106/89 |
| 4,259,121 | 3/1981 | Mathiew | 106/104 |
| 4,286,991 | 9/1981 | Galer et al. | 106/104 X |
| 4,286,992 | 9/1981 | Galer et al. | 106/104 X |
| 4,352,693 | 10/1982 | Langdon | 106/104 |
| 4,404,031 | 9/1983 | Sadoh et al. | 106/104 X |
| 4,409,030 | 10/1983 | Minegishi et al. | 106/104 X |
| 4,419,136 | 12/1983 | Rice | 106/314 X |

FOREIGN PATENT DOCUMENTS

| | | | |
|---|---|---|---|
| 2249138 | 10/1973 | France | 106/104 |
| 0017511 | 2/1977 | Japan | 106/104 |
| 0139635 | 10/1979 | Japan | 106/104 |
| 0110451 | 7/1983 | Japan | 106/104 |
| 0120583 | 7/1983 | Japan | 106/89 |
| 0161956 | 9/1983 | Japan | 106/104 |
| 2099808 | 12/1982 | United Kingdom | 106/104 |

*Primary Examiner*—William R. Dixon, Jr.
*Assistant Examiner*—Karl Group
*Attorney, Agent, or Firm*—Brooks Haidt Haffner & Delahunty

[57] ABSTRACT

A settable cementitious composition is produced by mixing a ground mineral composition containing the phase $4CaO.3Al_2O_3.SO_3$, in the presence of water, with a source of alkali metal or alkaline earth metal under alkaline conditions. In the pump packing method of stowing cavities in underground mines, an aqueous slurry of the mineral composition is mixed with a second slurry containing calcium sulfate, lime and, preferably, bentonite, an alkali metal sulfate and a setting and/or hardening accelerator. The components may be provided initially as a dry mixture. A preferred mineral composition comprises at least 15% by weight of $4CaO.3Al_2O_3.SO_3$, less than 1% by weight of free lime, less than 25% by weight of $CaO.2Al_2O_3$ and not more than 10% by weight of $12CaO.7Al_2O_3$.

10 Claims, 1 Drawing Sheet

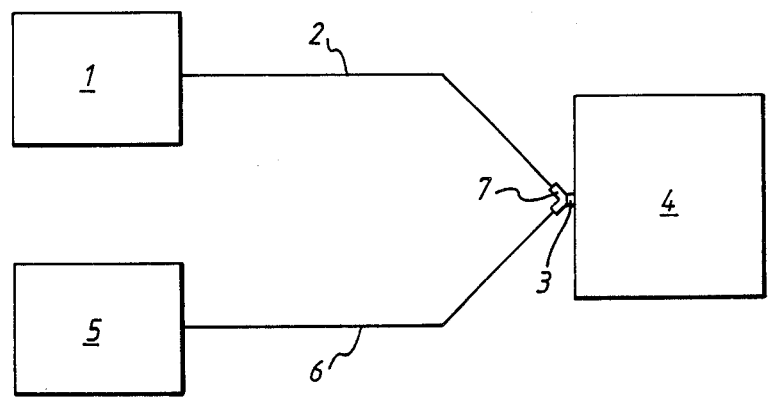

SETTABLE MINERAL CLINKER COMPOSITIONS

This application is a continuation of application Ser. No. 06/792,746, filed Oct. 30, 1985 abandoned.

FIELD OF THE INVENTION

The present invention relates to a method of producing a settable cementitious composition that is suitable, for example, for the stowing of cavities in underground mines; to dry mixtures from which such cementitious compositions may be prepared; and to a novel mineral composition that may constitute the basis of such cementitious compositions.

BACKGROUND OF THE INVENTION

In one known method of stowing cavities in underground mines, a first aqueous slurry containing a cement and a second aqueous slurry containing an inorganic salt that accelerates the setting and hardening of the cement are pumped to the site of the cavity where they are mixed together to form the filling composition which is allowed to set in the cavity to form a hardened mass. This procedure is called "pump packing" and a variety of materials have been developed for use in it. The second aqueous slurry generally contains calcium sulfate (especially natural or synthetic anhydrite) and lime (calcium oxide and/or calcium hydroxide and it is also common practice to include a clay such as bentonite.

In underground mines, high alumina cement has advantages over ordinary Portland cement in that it is much less aggressive to the skin and is therefore more easily handled; for that reason, high alumina cement is commonly employed in the pump packing process. However, high alumina cement also suffers from the disadvantage that it has a very short setting time; thus, high alumina cement as defined by British Standard (B.S.) 915, part 2, is required to show an initial setting time of from two to six hours and a final setting time not more than two hours after the initial set. This can cause serious problems in underground mining operations where the rigorous control and supervision of the mixing and pumping procedures are difficult. The relatively short setting time makes it necessary for the apparatus for pumping and mixing the cement slurry to be flushed clean after every cavity-filling operation in order to prevent the apparatus becoming blocked with set material. Such an occurrence may require parts, or even the whole, of a mixing and pumping system to be renewed or mechanically cleaned out; this can be a time-consuming and expensive task, especially if the production in the mine is halted.

There is clearly a need in the art for a method of producing a satisfactory cementitious composition that is based upon a material that has the advantages associated with high alumina cement but which avoids or lessens the problems associated with short initial setting times.

SUMMARY OF THE INVENTION

The present invention provides a method of producing a settable cementitious composition wherein a ground mineral composition is mixed in the presence of water with a source of alkali metal or alkaline earth metal under alkaline conditions, the said mineral composition containing the phase $4CaO.3Al_2O_3.SO_3$.

The present invention also provides a settable cementitious composition whenever produced by such a method; a hardened mass formed by the setting of such a cementitious composition; and dry mixtures from which the cementitious compositions may be produced by the admixture of water.

The present invention also provides, as a novel composition of matter, a mineral composition that contains at least 15% by weight of $4CaO.3Al_2O_3.SO_3$, not more than 1.0% by weight of free lime, less than 25% by weight of $CaO.2Al_2O_3$ and not more than 10% by weight of $12CaO.7Al_2O_3$.

Mineral compositions of this description, when ground and mixed with water, can exhibit long and controlled setting times and are therefore especially useful as the basis for the above-mentioned cementitious compositions.

The mineral compositions of this invention may be produced, initially as a clinker, by a process in which a suitably proportioned mixture of a source of CaO, a source of $Al_2O_3$ and a source of $SO_3$ is heated to at least the temperature of incipient fusion under conditions that are oxidising with respect to iron. The resultant clinker may be cooled and then ground, that is to say reduced to particulate form, by any appropriate means.

BRIEF DESCRIPTION OF THE DRAWING

The accompanying drawing is a flow sheet representing an exemplary pump packing process.

DESCRIPTION OF PREFERRED EMBODIMENTS

The mineral compositions to be used in the present method may be described as "sulfoaluminous". The mineral phase $4CaO.3Al_2O_3.SO_3$ is known as Klein's compound and may also be represented by $3CaO.3Al_2O_3.CaSO_4$ or $C_4A_3\bar{s}$. Clinkers containing Klein's compound, their production and their use as expansive agents in Portland cement compositions are known; see U.S. Pat. Nos. 3,155,526 (Klein), 3,251,701 (Klein) and 3,857,714 (Mehta) and 4,419,136 (Rice). However, in the practice of the present invention, it is preferred to employ the novel mineral composition described above.

The mineral composition to be used in the present invention will contain usually at least 25% by weight, preferably at least 35% by weight and especially at least 45% by weight, of $C_4A_3\bar{s}$. In principle, by using very pure raw materials in an electric reverberatory furnace it would be possible to obtain a mineral clinker having a content of $C_4A_3\bar{s}$ approaching 100%, although the production costs would be relatively high. A $C_4A_3\bar{s}$ content of up to 55% by weight of the mineral composition, typically about 50%, is adequate for many applications, but it may be appropriate to have a $C_4A_3\bar{s}$ content of up to 65 68%, or even up to 85%, by weight in certain cases. The percentage-by-weight figures are determined from the chemical analysis by calculation of the potential phase composition and are checked by X-ray diffraction.

It has been found that the presence of a significant quantity of free lime (CaO) is undesirable, as it may lead to premature setting of a cement composition incorporating the mineral composition. Accordingly, it is preferred that the content of free lime be less than 0.5%, especially less than 0.2%, by weight of the mineral composition; ideally, free lime should be substantially absent from the mineral composition.

It has also been found that the presence of a significant quantity of $CaO.2Al_2O_3$ (abbreviated to $CA_2$) can seriously impair the setting time and the development of strength of a cement composition produced from the mineral composition. Preferably, the content of $CA_2$ is not more than 10%, more preferably not more than 5% and especially not more than 3%, by weight of the mineral composition; ideally, $CA_2$ is substantially absent. However, relatively high levels of $CA_2$, e.g. 20% or more, can be accepted if slow development of strength and long setting times can be tolerated or if higher levels of the mineral composition are used in the slurry.

The mineral phase $12CaO.7Al_2O_3$ (abbreviated to $C_{12}A_7$) reacts gradually with water to produce lime; accordingly, in order to avoid premature setting, it is appropriate to have only a low content, preferably less than 5% by weight, of $C_{12}A_7$ in the mineral composition. However it has been found to be beneficial, especially with regard to the strength development of the cement composition, to retain a small quantity of $C_{12}A_7$ within the mineral composition, preferably in an amount of at least 0.5% and typically up to 4%, especially about 3%, by weight. Nevertheless, the use of a mineral composition from which $C_{12}A_7$ is substantially absent is also possible.

In order to obtain a high content of $C_4A_3\bar{s}$ in the mineral composition, it is necessary to limit the quantity of various other phases therein. Thus, it is preferred that the content of calcium titanate ($CaO.TiO_2$, abbreviated to CT) be less than 5%, especially less than 1% by weight; ideally it is substantially absent. Iron oxide ($Fe_2O_3$, abbreviated to F) forms a ferrite phase which approximates in composition to $4CaO.Al_2O_3.Fe_2O_3$ (abbreviated to $C_4AF$) and by removing lime and alumina from the composition limits the quantity of Klein's compound accordingly. In view of this dilution effect, which adversely affects the strength development of the set cementitious composition, the content of ferrite phase is preferably less than 10%, especially less than 5%, by weight; ideally it is substantially absent. Silica ($SiO_2$, abbreviated to S) tends to be present in the mineral composition as the phase $C_2AS$ and therefore tends to combine with $Al_2O_3$ that could otherwise contribute to the formation of Klein's compound; accordingly, it is preferred that the content of $SiO_2$ in the mineral composition be less than 10%, especially less than 5% and more especially less than 3%, by weight.

Surprisingly, unless it is wished to maximise the content of $C_4A_3\bar{s}$, the presence of a substantial quantity of $CaO.Al_2O_3$ (abbreviated to CA), in the mineral composition, for example up to 20% by weight without a retarder or up to 60%, e.g. up to 45%, by weight with a retarder, can be tolerated without seriously modifying the low reactivity of the mineral composition with water.

It is preferred that the mineral composition should contain no $SO_3$ in excess of that required to form the $C_4A_3\bar{s}$: thus, it is preferred that calcium sulfate ($CaSO_4$ or $C\bar{s}$) should be substantially absent from the mineral composition. However, an excess of $CaSO_4$ may be desirable to assist in melt formation in a melt process for the production of the mineral clinker if the corresponding dilution of physical properties of the product is acceptable. A preferred class of mineral compositions according to the present invention is characterised by a maximum $SO_3$ content of 8.5% by weight.

The mineral composition according to the present invention can be manufactured by either sintering or melting the raw materials in any suitable furnace, for example a Portland cement clinker rotary kiln or a reverberatory hearth furnace, in general at a temperature of at least 1200° C.

Normally, the raw materials will be selected and proportioned in order to produce the maximum economic level of Klein's compound; this will usually require the use of raw materials having a relatively high purity. An appropriate source of CaO is limestone. A suitable source of $SO_3$ is calcium sulfate, for example gypsum, hemihydrate or anhydrite; however, it is also possible to introduce the sulphur from other sources, for example by using a fuel having a high sulphur content for firing the furnace. A suitable source of $Al_2O_3$ is bauxite; however, it would also be possible to use aluminium metal. e.g. scrap aluminium, the combustion of which would contribute energy to the burning of the clinker materials.

It may be necessary to adjust the fineness of the raw materials in order to ensure that the free lime content of the final clinker is as low as possible. For example, when a sintering process in a rotary kiln is employed, a fineness corresponding to 90% passing through a British Standard 90-micron sieve should generally be adequate, whereas coarser raw materials could be tolerated if a melting process is used.

In order to obtain the maximum benefits, careful control of the mineral composition within the above-discussed parameters is important. Such control, and the selection and proportioning of the raw materials, should be well within the competence of the skilled cement manufacturer. Where the type of process used restricts the quantity of $C_4A_3\bar{s}$ that can be obtained, such as a sintering process in a Portland cement clinker rotary kiln (which, unless specially adapted, generally sets a practical limit upon the amount of liquid that can be present during burning), any excess calcium aluminate should be present in the clinker as the monocalcium aluminate CA rather than the calcium dialuminate $CA_2$. It has been found that, in order to avoid the formation of $CA_2$ in the clinker, the composition should be balanced towards the lime-rich region of $C_{12}A_7$, preferably such that up to 5% by weight of $C_{12}A_7$ is present.

It is necessary to ensure that the burning environment remains oxidising with respect to iron, since the reduction of Fe(III) will give Fe(II) which will act as a CaO replacement, while $C_4AF$ will no longer form, and the $C_{12}A_7$ content will become excessive and undesirable quantities of free lime may form. The presence of FeO in the aluminate phases of the clinker may impair the strength development of the cement composition.

It should be mentioned that, under adverse conditions in the furnace, calcium sulfate could decompose into sulphur trioxide and calcium oxide, leaving undesirable inclusions of free lime in the final clinker and possibly giving rise to high levels of $C_{12}A_7$. However, the oxygen level in the furnace or kiln can be regulated in order to adjust (preferably minimise) the rate of volatilisation of $SO_3$ from the calcium sulfate, and can thus be used as a fine control to prevent or limit the formation of $CA_2$. The formation of free lime can also be minimised by avoiding excess calcium sulfate in the raw material mix.

When coal is used as a fuel, the ash content should be regarded as one of the raw materials in order to ensure that the appropriate balance of components in the composition is maintained.

A typical sulfoaluminous composition may be produced by sintering appropriate raw materials in a rotary kiln to produce a clinker which comprises 50% $4CaO.3Al_2O_3.SO_3$, 15% $CaO.Al_2O_3$, 20% $2CaO.Al_2O_3.SiO_2$ and small proportions of either $CaO.2Al_2O_3$ or $12CaO.7Al_2O_3$ together with $CaO.TiO_2$ and a ferrite phase of the approximate composition $4CaO.Al_2O_3.Fe_2O_3$. At least some of the $CaO.Al_2O_3$ phase may be replaced by $4CaO.3Al_2O_3.SO_3$ and vice versa. Preferably the composition contains at least 25% and more preferably 45% of $4CaO.3Al_2O_3.SO_3$ by weight.

It may be advantageous to include a source of fluorine, e.g. calcium fluoride ($CaF_2$), in that it enables combination to proceed at relatively low burning temperatures. Furthermore, by modifying the main clinker phases, fluorine lowers their reactivity and may therefore contribute to the retardation of the reaction of the mineral composition with water. Thus, an increase in the level of fluorine in the mineral composition will tend to increase the time for which a slurry containing that composition will remain pumpable. For example, where a pumpability time of from 1 to 4 days is desirable, as in coal-mining applications, the level of fluorine retained in the mineral clinker will typically be from 0.15 to 0.25% by weight; howver, higher levels of fluorine, up to 1% by weight or even higher, are not excluded.

The mineral clinker can be cooled quickly by water quenching or in a conventional Portland cement clinker cooler. It is, however, also possible to cool the clinker slowly from a melt. The cooled clinker may then be ground to a level of fineness appropriate to the intended use.

The mineral composition to be used according to the present invention is not significantly hydraulic (i.e. it sets very slowly when reacted with water). Accordingly, to produce a cementitious composition from the mineral composition, the latter requires activation. This may be achieved by mixing the ground clinker, in an aqueous medium, with a source of alkali metal (e.g. Li, Na or K) or alkaline earth metal (e.g. Ca) under alkaline conditions. The alkali, or alkaline earth, metal (or rather, the cations thereof) may be supplied, for example, in the form of the corresponding hydroxide, sulfate, chloride, carbonate or aluminate. In certain preferred embodiments, the ground mineral clinker is hydraulically set by mixing an aqueous slurry thereof with an aqueous slurry comprising a source of calcium ions, e.g. a mixture of calcium sulfate and lime (calcium oxide and/or hydroxide); although the lime may be supplied as such i.e. in the form of slaked or hydrated lime), it is also possible to employ ordinary Portland cement as a source thereof in circumstances where added strength is required rather than long pumpability times. Ordinary Portland cement commonly comprises calcium sulfate and may therefore be used as a source thereof in appropriate applications of this invention.

Thus, for example, the mineral composition may be mixed in any appropriate proportion (in general from 1:99 to 99:1, by weight) with an activating composition, said activating composition comprising (a) 5 to 90%, preferably 40 to 85%, of calcium sulfate, (b) 5 to 60%, preferably 10 to 25% of a source of lime (expressed as $Ca(OH)_2$), (c) optionally up to 10%, preferably 1 to 10% and especially 2 to 5%, of one or more further inorganic salts, (d) optionally up to 25%, preferably 0.5 to 25% and especially 5 to 15% by weight of clay, e.g. bentonite, and (e) optionally up to 2%, preferably up to 0.5%, of a retarder, the percentages being relative to the total of components (a)–(e) on a dry weight basis.

The sulfoaluminous compositions are especially useful in the stowing of cavities in underground mines by pump packing. In contrast to slurries of high alumina cement and due to the intrinsically very low hydraulic reactivity of the $C_4A_3\bar{s}$, a slurry of the sulfoaluminous composition (the "first slurry") can be left standing in mixing and pumping apparatus for prolonged periods. Thus, whereas the minimum 24-hour strength of high alumina cement according to B.S. 915 is 40 $MNm^{-2}$, the 24-hour strengths of a typical ground mineral clinker according to the present invention is about 0.5 $MNm^{-2}$. Generally, a sulfoaluminous composition of this type would by itself not find acceptance in building or construction work as a cement. Accordingly, the present invention can render it unnecessary to flush the mixing and pumping system clear of the first slurry after each stowing operation, which slurry can usually be left in the system for over a working shift without fear of blockage due to setting. This not only results in the saving of time and material but also improves the working conditions because of the reduction in waste materials and cleaning water.

As mentioned above, the mineral composition of the present invention may contain phases such as $C_{12}A_7$ and CA that are known to react with water. Surprisingly, however, the presence of these phases, in amounts not exceeding the above-specified upper limits, appears not to affect adversely the setting characteristics of the mineral composition in the aqueous slurry. Any tendency to set within a period shorter than, say, 20 hours can be readily overcome by including a relatively inexpensive retarder, especially citric acid, in the slurry. It is also surprising that the intrinsically slow setting characteristics of the mineral composition are exhibited even in the substantial absence of a calcium sulfate phase (calcium sulfate being well known in cement technoogy as a set-retarder.

For stowing of cavities by the pump packing method, the sulfoaluminous clinker should be ground to a fineness such that settling of the resultant particles does not occur when an aqueous suspension thereof is held for long periods. Preferably, the particle size distribution is such that at least 95%, especially at least 98%, by weight of the material has a particle size of less than 45 microns; to achieve this, it may be necessary to use a grinding aid, for example propylene glycol or triethanolamine. It is also possible to employ a suspending agent, such as a cellulose ether, which may be added to the clinker before, during or after grinding or which may be added to the gauging water. (Although the use of a suspending agent could prevent the rapid settling of relatively coarsely ground clinker particles, the use of such coarse material is not favoured as it tends to hinder crystal growth during the hydraulic settling reaction.) The pumpability of the first slurry can be improved by the addition of a small quantity of citric acid, for example to the clinker entering the clinker grinding mill or to the ground clinker or to the gauging water.

The aqueous slurry (the "second slurry") with which the first slurry is mixed in the pump packing method to form the cementitious composition preferably contains calcium sulfate, clay (e.g. bentonite) and hydrated lime, together with small amounts of an alkali metal sulfate (e.g. $K_2SO_4$) and a setting and/or hardening accelerator.

The calcium sulfate may be provided as, for example, gypsum, hemihydrate, natural anhydrite, synthetic anhydrite or a mixture thereof; it is particularly preferred that the calcium sulfate should be at least 50% by weight of anhydrite. The calcium sulfate is preferably ground to a particle size of less than 250 microns, for it has been found that coarser particles may delay the strength development of the cementitious compositions; however, it has also been found that an excess of particles having a size less than 2 microns may delay setting.

Bentonite has been found to be effective in helping to maintain the solids in suspension in the second slurry and in the settable composition.

Preferred accelerators are the salts, e.g. the carbonates, of the alkali metals, especially lithium.

The inclusion of an alkali metal sulfate has been found to promote the formation of ettringite, the presence of which in the set composition is desirable. It may be mentioned that any CA phase in the mineral composition will tend to react with the calcium sulfate and hydrated lime from this second slurry and form ettringite or other calcium sulfoaluminate hydrate.

By way of example, the method of the present invention will be described with reference to the accompanying drawing. A sulfoaluminous composition and water are mixed into a slurry in mixer/pump means 1 and pumped along a first pipeline 2 towards a discharge outlet 3 adjacent to a cavity site 4 in an underground mine. The cavity site may be enclosed with shuttering or may be a large bag positioned in an appropriate position. Other materials, including calcium sulfate, lime, bentonite and water are mixed into a second slurry in further mixer/pump means 5 and pumped along a second pipeline 6 to which is connected to the first pipeline 2 by a 'Y' adaptor 7 located in the vicinity of the cavity site. In use, when the two mixer/pump means 1, 5 are operating simultaneously, the two slurries are splash mixed adjacent to the discharge outlet 3 upon entering the cavity. The resulting mixture hydrates and sets to a hardened mass filling or partly filling the cavity, the hardened mass usually containing ettringite or other calcium sulfoaluminate hydrate.

When strength is not of primary importance, it is possible to fill the cavities with the settable composition as a foam, using conventional foaming agents, to produce a low-cost filling composition of reduced density.

The mineral composition of the present invention can be used in a number of other applications, for which it may be ground to an appropriate fineness (which may be finer or coarser than the level recommended above for the stowing of cavities in underground mines). The mineral composition of this invention may be interground or otherwise mixed with adjuvant materials such as Portland cement clinker, gypsum, anhydrite, high alumina cement clinker, granulated blast furnace slag (e.g., with the slag in the amount of up to 65% by weight of total dry solids). pulverised fuel ash (e.g., with the ash in an amount of up to 50% by weight of total dry solids) or other latently hydraulic or pozzolanic material, pigments, hydrated lime, bentonite, any inert material conventionally included in mortars or concretes, or mixtures of any of these if the adjuvant material contains available alumina, that alumina may augment the ettringite or other calcium sulfoaluminate hydrate formed during hydration. In some instances, it may be appropriate to blend the mineral clinker with one or more of the aforesaid materials, either as coarse materials or finely ground materials or as a mixture of coarse and fine materials, as appropriate for the desired properties.

The initial poor reactivity (which gives good flowability properties) and the subsequent rapid development of strength exhibited by the mineral composition makes it suitable for use in special grouts such as tile adhesives and self-levelling floor screeds.

The mineral composition may also be used, especially in admixture with bentonite, as the basis for a casting plaster, especially for the production of high quality mouldings having fine detail. The bentonite, in addition to functioning as a suspending agent in the preparation of the initial slurry, contributes to the production of a plaster having a comparatively low density (which is advantageous in the manufacture of, for example, decorative mouldings for ceilings). The low density of the mineral composition/bentonite mixture also renders it suitable as a lightweight insulating plaster or a bone-setting material.

Water can be present in the settable compositions in an amount from 2% to 99%, typically from 15% to 90%, by weight of the total composition, depending upon the application. For pump packing purposes, the amount will preferably be 55% to 75% by weight, whereas for such other purposes as building materials and grouts for mining the amount of water may be 25 to 40% by weight.

Apart from pump packing and similar procedures, the settable composition may be prepared by mixing the solid components directly with water. Thus, in commercial practice, the ground mineral composition and other solid components could be supplied as a dry blend to the end user, who would then need only to mix it with water. Of course, the end user is not precluded from adding further components appropriate to his particular application.

For pump packing and similar operations, the solid components may be supplied as, for example, a two-part pack; thus, one part may comprise the dry ground mineral composition and, optionally, other components such as a suspension aid and a set-retarder, for the preparation of the first slurry by admixture of or to water, the second part comprising dry components which, upon admixture to or of water, will provide a slurry containing a source of alkali metal or alkaline earth metal under alkaline conditions. Typically, the second part of the two-part pack will comprise calcium sulfate, lime, clay, an alkali metal sulfate and a setting and/or hardening accelerator.

The present invention is illustrated by the following Examples.

EXAMPLE 1

A raw feed mix was prepared, which mix comprised 43.48 parts by weight of bauxite, 31.96 parts by weight of limestone, 24.57 parts by weight of anhydrite and 1.22 parts of coal ash. The analysis of the three major components was as shown in the following Table (in which the figures are percentages by weight, and "L.O.I." stands for loss on ignition):

TABLE 1

|  | Bauxite | Limestone | Anhydrite |
| --- | --- | --- | --- |
| $SiO_2$ | 5.8 | 0.7 | 0.3 |
| $Al_2O_3$ | 81.7 | 0.2 | 0.1 |
| $Fe_2O_3$ | 1.7 | 0.1 | 0.1 |
| CaO | 1.6 | 55.4 | 41.9 |
| $SO_3$ | 0.5 | — | 56.4 |
| $TiO_2$ | 3.0 | — | — |

TABLE 1-continued

|   | Bauxite | Limestone | Anhydrite |
|---|---------|-----------|-----------|
| F | — | — | 1.1 |
| L.O.I. | 0.16 | 43.4 | 0.7 |

The raw feed mix was fired at 1450° C. in an oil-fired reverberatory furnace. The chemical analysis and the calculated composition of the resultant clinker are given below in Tables 3 and 4 respectively.

EXAMPLE 2

A raw feed mix was prepared, which mix contained 57.7 parts by weight of bauxite, 55.1 parts by weight of limestone, 22.2 parts by weight of anhydrite and 1.8 parts by weight of coal ash. The analyses of the limestone and anhydrite were as shown in Table 1 above; the bauxite, however, had the following chemical analysis (in percent by weight):

TABLE 2

|   | Bauxite |
|---|---------|
| $SiO_2$ | 6.5 |
| $Al_2O_3$ | 86.0 |
| $Fe_2O_3$ | 0.9 |
| $Mn_2O_3$ | less than 0.01 |
| $P_2O_5$ | 0.15 |
| $TiO_2$ | 4.0 |
| CaO | 0.3 |
| MgO | 0.3 |
| $SO_3$ | 0.07 |
| $K_2O$ | 0.95 |
| $Na_2O$ | 0.07 |
| L.O.I. | 0.3 |

The raw mix was slurried in water and then fed to a coal-fired rotary kiln in which it was sintered at 1450° C. (The coal ash given in the composition of the raw mix represents the ash incorporated into the material during sintering; this is in contrast to Example 1 in which coal ash was added at the start in order to simulate coal firing.) The chemical analysis and the calculated composition of the resultant clinker are given below in Tables 3 and 4 respectively.

TABLE 3

| Chemical Analysis (% wt.) of the mineral clinker | | |
|---|---|---|
|   | Example 1 | Example 2 |
| $SiO_2$ | 4.3 | 4.6 |
| $Al_2O_3$ | 47.7 | 46.0 |
| $Fe_2O_3$ | 1.1 | 1.6 |
| $Mn_2O_3$ | — | 0.01 |
| $P_2O_5$ | — | 0.09 |
| $TiO_2$ | 2.3 | 2.1 |
| CaO | 36.0 | 37.6 |
| MgO | 1.5 | 0.6 |
| $SO_3$ | 6.0 | 6.6 |
| $K_2O$ | 0.18 | 0.42 |
| L.O.I. | 0.1 | 0.6 |
| Free lime | 0.08 | 0.12 |

TABLE 4

| Calculated Composition (% wt.) of the mineral clinker. | | |
|---|---|---|
|   | Example 1 | Example 2 |
| $C_4A_3\bar{s}$ | 45.7 | 50.3 |
| $C_2AS$ | 19.6 | 21.0 |
| CA | 16.8 | 17.7 |
| $C_4AF$ | 3.4 | 4.9 |
| CT | 4.3 | 3.9 |
| $CaSO_4$ | 0.0 | 0.0 |
| $CA_2$ | 2.6* | 0.6 |
| $C_{12}A_7$ | 0.0 | 0.0 |

*This value of 2.6 was obtained by X-ray diffraction measurement.

EXAMPLE 3

Four samples of a raw feed mix were prepared, each containing 43.48% by weight bauxite, 31.96% by weight of limestone and 24.57% by weight of anhydrite, which raw materials had chemical analyses as given in Table 1 above. Coal ash was not included in these particular samples. The samples differed in coarseness: the +90 micron residue was 0.1% for sample No. 1, 4.0% by weight for sample No. 2, 9.3% by weight for sample No. 3 and 20.5% by weight for sample No. 4.

Each sample was burned in a pilot-scale oil-fired furnace at 1450° C. The phase composition of each resultant clinker was determined and the results are given in the following Table:

TABLE 5

| Composition (% wt) of the mineral clinkers. | | | | |
|---|---|---|---|---|
|   | Sample No. | | | |
|   | 1 | 2 | 3 | 4 |
| $C_4A_3\bar{s}$ | 46 | 50 | 50 | 68 |
| CA | 18 | 7 | 15 | 0.0 |
| $C_{12}A_7$ | 0.0 | 10 | 3 | 2 |
| $CA_2$ | 4 | 0.0 | 0.0 | 0.0 |
| $CaSO_4$ | 0.0 | 0.0 | 0.0 | 0.0 |
| $C_4AF$ | 5 | 5 | 5 | 5 |
| $C_2AS$ | 21 | 24 | 23 | 21 |
| CT | 4 | 4 | 4 | 4 |
| Free lime | 0.0 | 0.04 | 0.03 | 0.03 |

Each sample of mineral clinker was ground to 450 m²/g. One part by weight of ground clinker was, in each case, mixed with 2.5 parts by weight of water for 30 seconds, using a high shear stirrer, in order to prepare an aqueous slurry. The pumpability time (i.e. the time for which the slurry remains pumpable) was determined by measuring the resistance to shear of the slurry. These measurements were also carried out on slurries to which 0.2% by weight of citric acid had been added. The results are given in the following Table:

TABLE 6

|   | Pumpability time (h) | | | |
|---|---|---|---|---|
|   | Sample No. | | | |
| Additive | 1 | 2 | 3 | 4 |
| None | 15 | 12 | 15 | 15 |
| 0.2% Citric Acid | >24 | 20 | >24 | >24 |

A mixture comprising 70.1 parts by weight of anhydrite, 18 parts hydrated lime, 5 parts bentonite, 0.5 part sodium carbonate and 0.4 part lithium carbonate was prepared, and 1 part by weight of this mixture was mixed with 2.5 parts by weight of water using a high shear stirrer for 30 seconds. The resultant slurry was mixed with the slurry containing the ground mineral clinker and the setting time and strength development of the resultant cement composition were measured. The results of those measurements are given in the following Table:

TABLE 7

|  |  | Sample No. | | | |
| --- | --- | --- | --- | --- | --- |
|  |  | 1 | 2 | 3 | 4 |
| Final set (min.) |  | 30 | 20 | 25 | 30 |
| Pack strength, | 2 h | 2.0 | 1.7 | 2.3 | 2.2 |
|  | 24 h | 3.9 | 3.5 | 4.1 | 3.9 |
|  | 7 d | 4.7 | 4.6 | 5.0 | 4.6 |
|  | 28 d | 5.0 | 4.8 | 5.3 | 4.9 |

EXAMPLES 4 TO 16

In these Examples, cement compositions are described that contain a ground mineral clinker manufactured by the procedure described above in Example 2. The indicated solid components were mixed with water in the indicated amounts (expressed in parts by weight) and the setting time of the composition was determined. The compressive strength of the set compositions was determined after curing the composition under ambient conditions for the specified periods of time.

EXAMPLE 4

| Composition: | | |
| --- | --- | --- |
| Sand | | 50 parts by weight |
| Mineral clinker | | 25 |
| Hydrated lime | | 15 |
| Anhydrite | | 10 |
| Citric acid | | 1 |
| Water | | 22.5 |
| Initial set: approx 6 min. | | |
| Compressive strength (sealed bags): | 3 h | 7.7 N/mm$^2$ |
|  | 6 h | 6.7 |
|  | 1 d | 16.9 |
|  | 3 d | 19.7 |
|  | 11 d | 26.3 |
|  | 28 d | 29.7 |

The composition set quickly and would be useful as a grout giving early strength, for example for use as a tile adhesive.

EXAMPLE 5

| Composition: | | |
| --- | --- | --- |
| Sand | | 50 parts by weight |
| Mineral clinker | | 25 |
| Hydrated lime | | 15 |
| Anhydrite | | 10 |
| Citric acid | | 1 |
| Melment F10 | | 1 |
| Water | | 20 |
| Initial set: approx 10 min. | | |
| Compressive strength (sealed bags): | 3 h | N/mm$^2$ |
|  | 6 h | 22.7 |
|  | 1 d | 38.6 |
|  | 3 d | 41.3 |
|  | 8 d | 48.1 |
|  | 28 d | 60.4 |

Melment F10 is a superplasticiser based on a melamine-formaldehyde polymer (Sueddeutsche Kalkstickstoff-Werke AG, Federal Republic of Germany). The superplasticiser allows a reduction in the water requirement, thereby giving a cement composition of high strength.

The composition would be useful as a patching material for roads and airport runways, as well as a shrinkage compensator.

EXAMPLE 6

| Composition: | |
| --- | --- |
| Sand | 50 parts by weight |
| Mineral clinker | 15 |
| Anhydrite | 6 |
| Ordinary Portland cement | 29 |
| Citric acid | 1 |
| Water | 22.5 |
| Initial set: approx 30 min. | |
| Compressive strength: 6 h | 16.9 N/mm$^2$ |

The composition would be suitable as a good quality grout.

EXAMPLE 7

| Composition: | |
| --- | --- |
| Sand | 50 parts by weight |
| Mineral clinker | 15 |
| Anhydrite | 6 |
| Ordinary Portland cement | 29 |
| Citric acid | 0.25 |
| Water | 20 |
| Initial set: approx 20 min. | |
| Compressive strength (sealed bags): 3 h | 4.5 N/mm$^2$ |

EXAMPLE 8

The composition was as described in Example 7, except that the water was reduced to 18 parts by weight. The initial set was approx. 17 min. and the compressive strength (sealed bags) after 1d was 27.0 N/mm$^2$.

EXAMPLE 9

The composition was as described in Example 7, except that the water was reduced to 16 parts by weight.

| Initial set: approx. 12 mins. | | |
| --- | --- | --- |
| Compressive strength (sealed bags): | 3 h | 7.7 N/mm$^2$ |
|  | 7 d | 32.8 |
|  | 28 d | 29.9 |

EXAMPLE 10

The composition was as described in Example 7, except that the amount of water was reduced to 14 parts by weight. The initial set was approx. 5 min. and the compressive strength (sealed bags) after 3 h. was 7.4 N/mm$^2$.

EXAMPLE 11

The composition was as described in Example 9, except that the quantity of citric acid was only 0.125 part by weight. The initial set was approximately 5 min. and the compressive strength (sealed bag) after 3 h. was 5.1 N/mm$^2$.

EXAMPLE 12

| Composition: | |
| --- | --- |
| Sand | 50 parts by weight |
| Mineral clinker | 25 |
| Hydrated lime | 15 |
| Anhydrite | 10 |
| Pulverised fuel ash | 25 |

| -continued | |
|---|---|
| Citric acid | 1 |
| Water | 35 |
| Initial set: approx. 15 min. | |
| Compressive strength (sealed bags): | 3 h   N/mm$^2$ |
| | 6 h   8.7 |
| | 1 d   20.5 |
| | 4 d   24.5 |
| | 9 d   22.5 |

The properties of the composition suggest that it would be suitable for making floor screeds.

EXAMPLE 13

| Composition: | |
|---|---|
| Sand | 50 parts by weight |
| Mineral clinker | 29 |
| Hydrated lime | 15 |
| Anhydrite | 6 |
| Citric acid | 1 |
| Water | 26 |
| Initial set: approx. 5 min. | |
| Compressive strength: 1 d | 14.1 N/mm$^2$ |

EXAMPLE 14

| Composition: | |
|---|---|
| Sand | 50 parts by weight |
| Mineral clinker | 18 |
| Ordinary Portland cement | 28 |
| Anhydrite | 3.5 |
| Citric acid | 0.5 |
| Water | 17.86 |
| Initial set: approx. 40 min. | |
| Compressive strength (sealed bag): 3 h | 3.4 N/mm$^2$ |

EXAMPLE 15

| Composition: | |
|---|---|
| Sand | 70 parts by weight |
| Mineral clinker | 25 |
| Ordinary Portland cement | 40 |
| Anhydrite | 5 |
| Citric acid | 0.5 |
| Water | 30 |
| Initial set: approx. 20 min. | |
| Compressive strength: 3 h | 3.3 N/mm$^2$ |

EXAMPLE 16

| Composition: | |
|---|---|
| Sand | 50 parts by weight |
| Mineral clinker | 25 |
| Hydrated lime | 15 |
| Anhydrite | 10 |
| Ground slag | 35 |
| Citric acid | 1 |
| Water | 30 |
| Initial set: 3 min. | |
| Hard set: 10 min. | |
| Compressive strength: 3 h | 3.3 N/mm$^2$ |

The aqueous mix as first prepared had a putty-like consistency.

EXAMPLE 17

A mineral clinker having the chemical analysis and phase composition described in Example 1 was ground to a specific surface area of 445 m$^2$/kg. The ground composition was then mixed with 2.5 times its weight of water to form a first slurry, a sample of which was tested in order to determine its pumping life. A mixture comprising 2.5% by weight of potassium sulfate, 0.3% of lithium carbonate, 10% of bentonite, 15% of hydrated lime and 72.2% of finely ground anhydrite was prepared. This mixture was then mixed with 2.5 times its weight of water in order to form a second slurry.

The first and second slurries were splash mixed in equal proportions, as in a pump packing operation, to form a settable cementitious composition, the strength of which was determined after two hours and again after 24 hours.

The pumping life and strength results are given below in Table 8.

EXAMPLE 18

A sulfoaluminous mineral clinker was produced, which clinker had a phase composition of 50.2% by weight of C$_4$A$_3\bar{s}$, 18.3% C$_2$AS, 4.1% CaSO$_4$, 4.1% CT, 3.4% C$_4$AF and 17.6% CA$_2$. The remainder to 100% was made up of minor constituents in insignificant amounts. No CA or C$_{12}$A$_7$ was found by X-ray diffraction.

The mineral clinker was ground to a specific surface area of 440 m$^2$/kg and was mixed with 2.5 times its weight of water to form a first slurry. This was mixed with a second slurry as described in Example 17. The pumping life and strength results are given in Table 8 below.

EXAMPLE 19

A composition was formed by mixing equal parts of the ground mineral clinkers described in Examples 17 and 18. The resultant composition was formed into a slurry and then mixed with a second slurry, as described in Example 17. The pumping life and strength results are given in Table 8 below.

TABLE 8

| Example No. | Pumping Life of first slurry (hours) | Strength of settable Composition (MN/m$^2$) | |
|---|---|---|---|
| | | After 2 hrs | After 24 hrs |
| 17 | 30 | 2.44 | 4.00 |
| 18 | 18 | 0.32 | 2.50 |
| 19 | 22 | 0.98 | 3.34 |

It will of course be understood that the present invention has been described above purely by way of example. and modifications of detail can be made within the scope and spirit of the invention.

We claim:

1. A mineral clinker oomposition containing 4CaO.3Al$_2$O$_3$.SO$_3$, in an amount of from 15 to 68%, and not more than 45.6% of 2CaO.Al$_2$O$_3$.SiO$_2$, the balance, if any, of the composition being composed essentially of at least one component selected from the group consisting of not more than 1.0% of free lime, less than 25% of CaO.2Al$_2$O$_3$, not more than 10% of 12CaO.7Al$_2$O$_3$, less than 5% of CaO.TiO$_2$, less than 10% of ferrite phase, up to 60% of CaO.Al$_2$O$_3$, and up to 4.1% of CaSO$_4$; the said percentages being by weight of the mineral clinker composition.

2. A composition according to claim 1 characterized in that it contains less than 20% by weight of CaO.Al$_2$O$_3$.

3. A composition according to claim 1 or 2, characterized in that it contains from 35% to 65% by weight of $4CaO.3Al_2O_3.SO_3$.

4. A composition according to claim 1 or 2 characterised in that it contains less than 0.5% by weight of free lime.

5. A composition according to claim 4 characterised in that it contains less than 0.2% by weight of free lime.

6. A composition according to claim 1 or 2 characterised in that it contains less than 5% by weight of $CaO.2Al_2O_3$.

7. A composition according to claim 1 or 2, characterised in that it contains less than 5% of $12CaO.7Al_2O_3$.

8. A composition according to claim 1 or 2, characterised in that a $CaSO_4$ phase is essentially absent.

9. A composition according to claim 1 characterised in that it contains less than 22.8% by a weight of $2CaO.Al_2O_3.SiO_2$.

10. A composition according to claim 1 or 9, characterised in that it is in a ground form.

* * * * *